(12) United States Patent
Kasahara et al.

(10) Patent No.: US 9,507,152 B2
(45) Date of Patent: Nov. 29, 2016

(54) HEAD-UP DISPLAY DEVICE

(71) Applicant: NIPPON SEIKI CO., LTD., Niigata (JP)

(72) Inventors: Tsuyoshi Kasahara, Niigata (JP); Yuichi Takahashi, Niigata (JP); Takashi Yamazoe, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 14/778,559

(22) PCT Filed: Feb. 14, 2014

(86) PCT No.: PCT/JP2014/053494
§ 371 (c)(1),
(2) Date: Sep. 18, 2015

(87) PCT Pub. No.: WO2014/148167
PCT Pub. Date: Sep. 25, 2014

(65) Prior Publication Data
US 2016/0291325 A1 Oct. 6, 2016

(30) Foreign Application Priority Data
Mar. 20, 2013 (JP) .................. 2013-057426

(51) Int. Cl.
*G02B 27/14* (2006.01)
*G09G 5/00* (2006.01)
*G02B 27/01* (2006.01)
*B60K 35/00* (2006.01)

(52) U.S. Cl.
CPC .......... *G02B 27/0101* (2013.01); *B60K 35/00* (2013.01); *G02B 2027/011* (2013.01); *G02B 2027/013* (2013.01); *G02B 2027/0145* (2013.01)

(58) Field of Classification Search
CPC ............ G02B 2027/013; G02B 27/01; G02B 27/0101; G02B 2027/014

USPC .................. 359/630, 631; 345/7–9
See application file for complete search history.

(56) References Cited

U.S. PATENT DOCUMENTS

| 5,657,163 A * | 8/1997 | Wu ...................... G02B 6/4298 |
| | | 359/630 |
| 2006/0215244 A1 | 9/2006 | Yosha et al. |
| 2010/0271698 A1 | 10/2010 | Kessler |

FOREIGN PATENT DOCUMENTS

| JP | 2004-226469 A | 8/2004 |
| WO | 2010/092409 A1 | 8/2010 |

OTHER PUBLICATIONS

International Search Report PCT/JP2014/053494 dated Mar. 11, 2015 with English translation.

*Primary Examiner* — William Choi
(74) *Attorney, Agent, or Firm* — McDermott Will Emery LLP

(57) ABSTRACT

Provided is a head-up display device capable of projecting a virtual image on a curved surface. a curved parallel mirror receives parallel beams from a collimator lens and outputs a plurality of transmitted beams by being configured such that a semi-transparent curved mirror and a curved mirror are arranged opposing each other, said semi-transparent curved mirror reflecting a portion of the parallel beams while allowing the other portion to pass through as transmitted beams, and said curved mirror reflecting parallel beams toward the semi-transparent curved mirror. The curved parallel mirror has a convex curved shape toward the transmission side such that when the outputted plurality of transmitted beams are reflected by a curved surface, the reflected transmitted beams become display beams representing a virtual image substantially parallel to a first plane.

4 Claims, 7 Drawing Sheets

HEAD-UP DISPLAY DEVICE

CROSS-REFERENCE TO RELATED APPLICATIONS

This application is the U.S. National Phase of PCT/JP2014/053494 filed Feb. 14, 2014, which claims priority to Japanese Patent Application No. 2013-057426 filed Mar. 20, 2013. The subject matter of each is incorporated herein by reference in entirety.

TECHNICAL FIELD

The present invention relates to a head-up display device.

BACKGROUND ART

A head-up display device disclosed in Patent Literature 1 is known as a conventional head-up display device. The head-up display device comprises a display device, a collimator lens, and a pair of plane mirrors arranged in parallel. One of the pair of plane mirrors is a semi-transparent mirror that reflects a part of incident light and transmits a part thereof. Light (image light) transmitted from the display device enters the collimator lens and becomes parallel light, and enters a pair of plane mirrors arranged in parallel. The parallel light entered into the pair of plane mirrors arranged in parallel repeats reflection between the plane mirrors. As one of the plane mirrors arranged in parallel is a semi-transparent mirror, a part of the parallel light entered into the semi-transparent mirror is emitted from the semi-transparent mirror. The parallel light emitted from the semi-transparent mirror is reflected by a plane transparent plate (so-called a combiner), and the parallel light reaches an eye of an observer. As the parallel light enters an eye of an observer, an observer recognizes as if a display image is present in a distant place by viewing a virtual image projected onto the combiner.

CITATION LIST

Patent Literature

Patent Literature 1: International Publication No. 2010-092409

SUMMARY OF THE INVENTION

Problems to be Solved by the Invention

In the head-up display device disclosed in Patent Literature 1, parallel light is emitted from the head-up display emits, and it is impossible to project a virtual image onto a curved surface. In other words, when a virtual image is projected onto a curved surface, nonparallel light enters an eye of an observer, and an observer does not recognize as if a display image is present in a distant place.

The present invention has been made in view of the circumstance described above. Accordingly, it is an object of the present invention to provide a head-up display device capable of visually recognizing a virtual image in a distant palace even when a projection object is a curved surface.

Solution to Problem

To achieve the above object, a head-up display device according to the present invention projects display light to a curved surface and allows recognizing an image represented by the display light as a virtual image by reflecting the display light on the curved surface, the head-up display device comprising a display means that emits light representing the image; a collimating optics that collimates the light emitted from the display means into parallel light; and a curved surface optics that enters the parallel light from the collimating optics and emits a plurality of transmitted light by oppositely arranging a semi-transparent curved surface that reflects a part of the parallel light and transmits a part thereof as transmitted light, and a curved reflection surface that reflects the parallel light to the semi-transparent curved surface, wherein the curved surface optics has a convex curved surface shape toward a transmission side such that when the emitted plurality of transmitted light is reflected by the curved surface, the reflected transmitted light becomes display light representing the virtual image substantially parallel to a first plane.

Effect of the Invention

According to the present invention, it is possible to recognize visually a virtual image in a distant place even when a projection object is a curved surface.

MODE FOR CARRYING OUT THE INVENTION

Embodiment

An embodiment of the present invention will be described with reference to FIG. 1 to FIG. 6.

Figure 1:
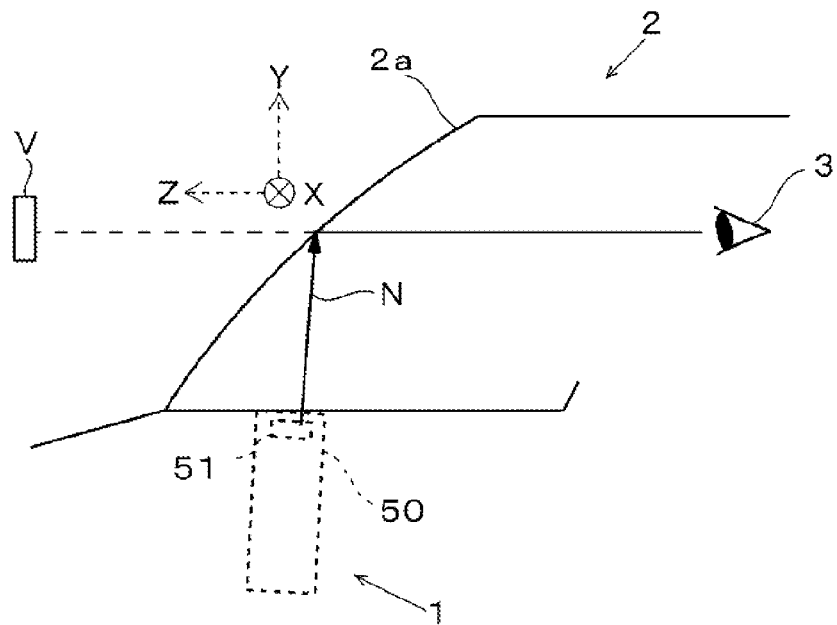
FIG. 1 is a schematic diagram showing a state that a head-up display device according to a first embodiment of the present invention is mounted on a vehicle.

FIG. 1 shows an outline of a head-up display device (hereinafter, referred to as a HUD device) according to an embodiment of the present invention. Here, a lateral direction of a vehicle 2 (a lateral direction of an eye 3 of an observer) is defined as an X-axis, a vertical direction of a vehicle 2 (a vertical direction of an eye 3 of an observer) is defined as a Y-axis, and a viewing direction of an observer vertical to the X-axis and Y-axis is defined as a Z-axis (FIG. 1).

A HUD device 1 according to the embodiment is installed on a dashboard of a vehicle 2 as shown in FIG. 1. The HUD device 1 emits display light N representing a virtual image V of a display image from an emitting part 51 to a windshield 2a (curved surface) of a vehicle 2. The display light N reflects on the windshield 2a, and reaches an eye 3 of an observer. The observer recognizes a virtual image V of a display image represented by the display light N reflected by the windshield 2a (a virtual image projected onto the windshield 2a). The observer recognizes, through the windshield 2a, as if the display image is present in a distant place.

Figure 2:
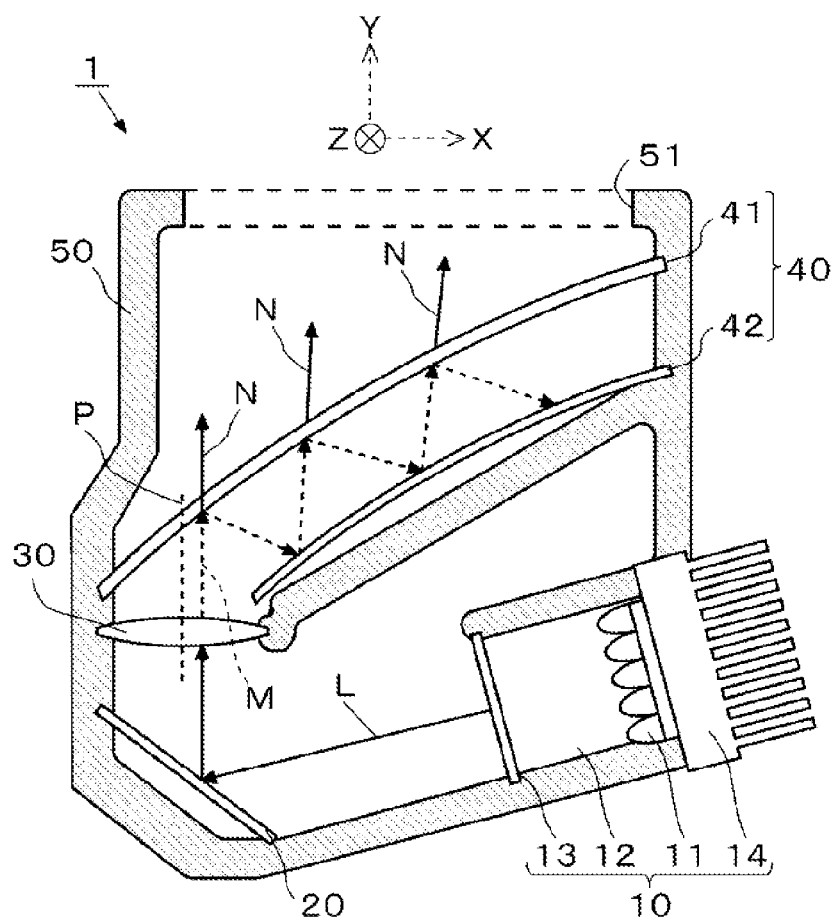
FIG. 2 is a schematic sectional view in an XY plane showing a configuration of a head-up display device according to the above embodiment.
Figure 3:
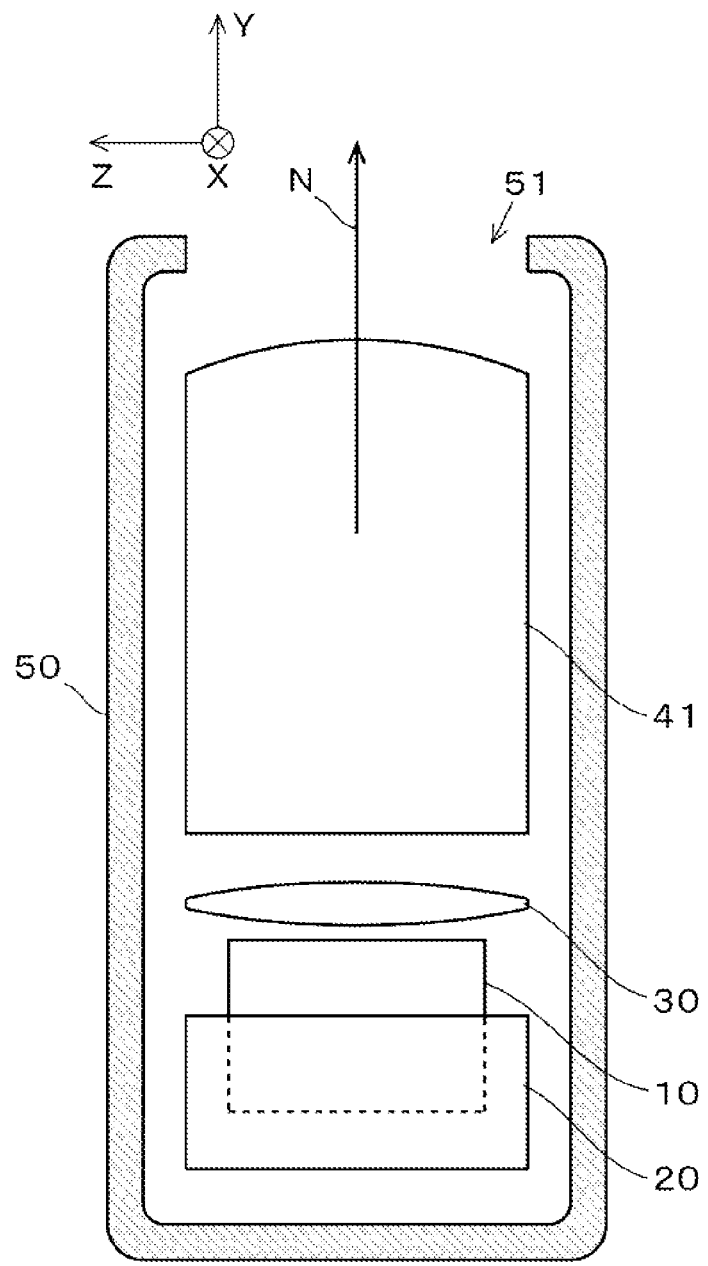
FIG. 3 is a schematic sectional view in a YZ plane showing a configuration of a head-up display device according to the above embodiment.

FIG. 2 is a schematic sectional view in the substantially XY plane of the HUD device 1 in the vehicle 2 (FIG. 1). FIG. 3 shows a schematic sectional view in the vertical direction of the HUD device 1 in the vehicle 2 (FIG. 1). Here, as in FIG. 1, a lateral direction of the vehicle 2 (a lateral direction of the eye 3 of the observer) is defined as an X-axis, a vertical direction of the vehicle 2 (a vertical direction of the eye 3 of the observer) is defined as a Y-axis, and a viewing direction of the observer vertical to the X-axis and Y-axis is defined as a Z-axis (FIGS. 2 and 3).

The HUD device 1 comprises, as shown in FIG. 2, a display means 10 disposed in a housing 50, a folding mirror 20, a collimator lens (collimating optics) 30, and a pair of curved parallel mirrors (curved surface optics) 40. Further, the HUD device 1 is provided with a control unit (not shown).

The image light L emitted from the display means 10 reflects on the folding mirror 20, and enters the collimator lens 30. The image light L is collimated by the collimator lens 30 (the collimator lens 30 emits parallel light M). The parallel light M emitted from the collimator lens 30 enters a pair of curved parallel mirrors 40. Of the pair of curved parallel mirrors, one curved mirror into which the parallel light M enters is configured of a semi-transparent curved mirror 41 (semi-transparent curved surface) that reflects a part of incident light and transmits a part thereof as transmitted light N. The parallel light M incident on the pair of curved parallel mirrors 40 repeats reflection between the pair of curved parallel mirrors 40, and a part of the parallel light M exits from the pair of curved parallel mirrors 40 as a plurality of transmitted light (display light) N (a plurality of transmitted light N passes through the semi-transparent curved mirror 41).

A plurality of transmitted light (display light) N passing through the semi-transparent curved mirror 41 exits from the emitting part 51 provided on a substantially XZ plane of the housing 50 (FIG. 3). The display light N exiting from the emitting part 51 enters the windshield 2a. The windshield 2a reflects a plurality of entered display light N, and the reflected display light N reaches the eye 3 of the observer.

In the embodiment, the windshield 2a is a glass having a predetermined curved surface (convex to the outside of the vehicle 2) (FIG. 1). A pair of curved parallel mirrors 40 enters the parallel light M from the collimator lens 30, and repeats reflection and transmission of the parallel light M between a pair of mirrors, thereby emitting a plurality of transmitted light N toward the emitting part 51 (the windshield 2a) as light tilted in advance an optical axis (divergent light) considering a curvature of the windshield 2a. The plurality of transmitted light N tilted in advance an optical axis considering a curvature of the windshield 2a becomes light parallel to the YZ plane when reflecting on the windshield 2a, and enters each of the left and right eyes 3 of the observer as light parallel in the lateral direction. Therefore, the observer recognizes, through the windshield 2a, as if a display image is present in a distant place.

A specific configuration of the HUD device 1 will be described. To facilitate the understanding of the invention, a description will be limited to the parallel light M emitted from the collimator lens 30.

(Display Means, Folding Mirror, Collimator Lens)

In the embodiment, the display means 10 comprises a light source 11, a diffusing part 12, a liquid crystal display panel 13, and a heat sink 14. The light source 11 comprises a plurality of LEDs (Light Emitting Diode). The light source 11 emits light for illuminating the liquid crystal display panel 13. The diffusing part 12 is a space formed as a part of the housing 50 between the light source 11 and the liquid crystal display panel 13. The inside wall of the diffusing part is painted with white paint to diffuse the light emitted from the light source 11, and illuminate the back of the liquid crystal display panel 13. The diffusing part 12 diffuses the light emitted from the light source, and uniformly illuminates the liquid crystal display panel. The liquid crystal display panel 13 generates a display image by modulating the illumination light from the diffusing part 12 according to a video signal transmitted from a control unit described later. The liquid crystal display panel 13 emits image light L representing a display image. The diffusing part 12 may be provided with a translucent synthetic resin member, such as polycarbonate colored in white, to transmit the light from the light source 11 to the liquid crystal display panel 13 by more efficiently diffusing the light.

The heat sink 14 is made of a metal such as aluminum, and dissipates the heat generated by the light source 11. The heat sink 14 is disposed on the surface of the light source 11 opposite to the surface for emitting light.

The folding mirror 20 is, for example, a plain aluminum deposited mirror, and reflects the image light L emitted from the liquid crystal display panel 13 to the collimator lens 30. The folding mirror 20 is disposed to be inclined with respect to the display surface of the liquid crystal display panel 13 to reflect the image light L by folding it (FIG. 2). Further, as the folding mirror 20 simply reflects the image light L to the collimator lens 30, it may be omitted depending on the arrangement of the display means 10 and the collimator lens 30.

The collimator lens 30 is a convex lens, for example. The collimator lens 30 is disposed on the optical path of the display light reflected by the folding mirror 20 such that the distance from the collimator lens 30 to a display image (the sum of the distance from the collimator lens 30 to the folding mirror 20 and the distance from the folding mirror 20 to the liquid crystal display panel 13) becomes substantially the same as the focal distance of the collimator lens 30 (FIG. 2). The collimator lens 30 collimates the incident display light. The collimator lens 30 has a lens optical axis P.

(A Pair of Curved Parallel Mirrors (Curved Surface Optics))

A pair of curved parallel mirrors 40 is formed by coating a dielectric multilayer film on a glass, and is configured by oppositely arranging a semi-transparent curved mirror 41, which reflects a part of incident light and transmits a part thereof, and a curved mirror 42 that is a plain aluminum deposited mirror.

Figure 4:
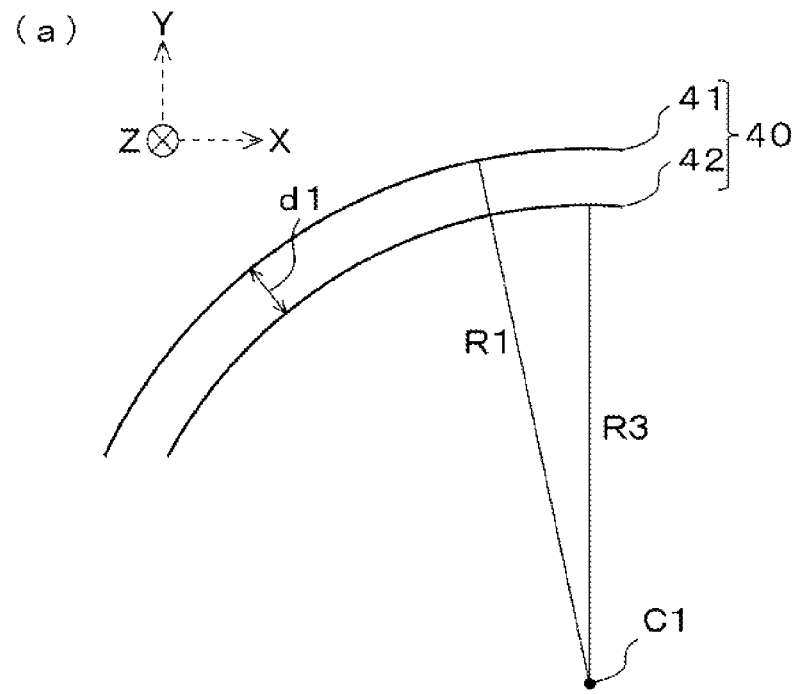
FIG. 4 shows diagrams explaining a radius of curvature of a curved parallel mirror according to the above embodiment: (a) is a schematic sectional view in an XY plane, and (b) is a schematic sectional view in a YZ plane.
Figure 4:
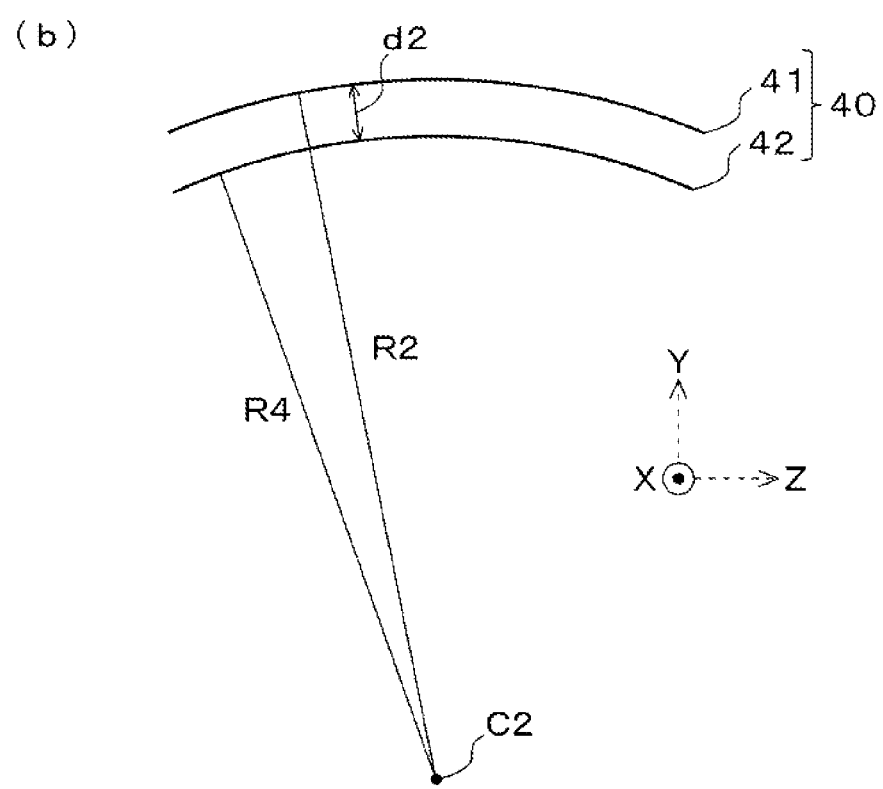

The semi-transparent curved mirror 41 is, as shown in FIG. 4 (a), formed on a rotation surface obtained by rotating an arc with a first radius of curvature R1 centered on a first axis C1 perpendicular to a second axis C2 (substantially in the Z-axis direction) (i.e., on a toroidal surface in which orthogonal radii of curvatures (R1 and R2) are different). The arc has, as shown in FIG. 4 (b), a second radius of curvature R2 (a reciprocal of a second curvature D2) centered on a second axis C2 substantially parallel to the X-axis direction. The reflection mirror 42 is, as shown in FIG. 4 (a), formed on a rotation surface obtained by rotating an arc with a fourth radius of curvature R4 centered on the first axis C1 (i.e., on a toroidal surface in which orthogonal radii of curvatures (R3 and R4) are different). The arc has, as shown in FIG. 4 (b), a third radius of curvature R3 (a reciprocal of a third curvature D3) centered on a second axis C2.

Further, the semi-transparent curved mirror 41 and the curved mirror 42 are arranged in parallel. In other words, a difference d1 becomes substantially equal to difference d2 (d1=d2). The difference d1 is between the first radius of curvature R1 of the semi-transparent curved mirror 41 and the third radius of curvature R3 of the curved mirror 42 centered on the first axis C1 (a distance between the semi-transparent curved mirror 41 and the curved mirror 42 centered on the first axis C1). The difference d2 is between the second radius of curvature R2 of the semi-transparent curved mirror 41 orthogonal to the first axis C1 and the fourth radius of curvature R4 of the curved mirror 42 centered on the second axis C2 (a distance between the semi-transparent curved mirror 41 and the curved mirror 42 centered on the second axis C2).

In the pair of curved parallel mirrors 40, the curved mirror 42 is arranged toward the collimator lens 30 side (FIG. 2). The pair of curved parallel mirrors 40 is, as shown in FIG. 5, arranged to be inclined to have a predetermined angle A (∠A<90°) between the lens optical axis P of the collimator lens 30 (the parallel light M emitting direction) and a normal S1 at a position where the lens optical axis P intersects the semi-transparent curved mirror 41.

The parallel light M parallel to the YZ plane emitted from the collimator lens 30 enters the semi-transparent curved mirror 41. To ensure the optical path of the parallel light M, the outer shape of the curved mirror 42 is smaller than that of the semi-transparent curved mirror 41.

Figure 5:
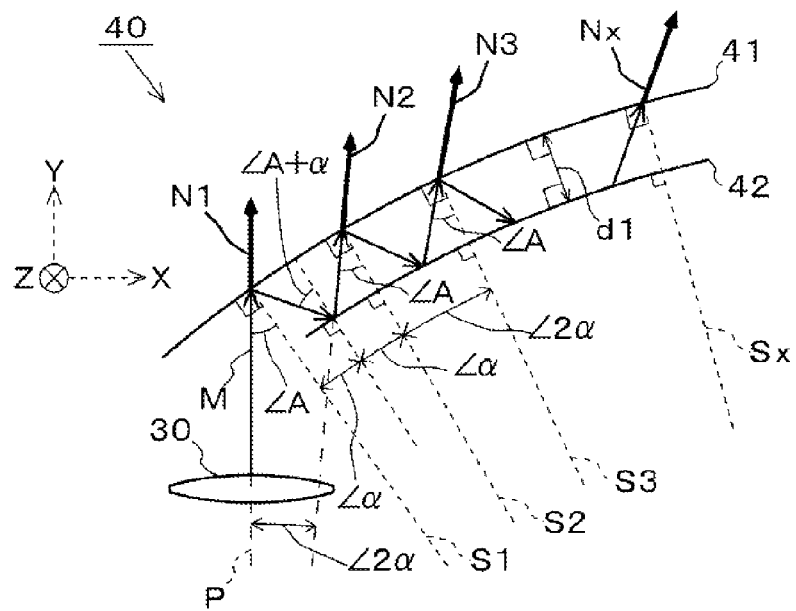
FIG. 5 is a diagram explaining an optical path of light traveling through a curved parallel mirror in the above embodiment.

Referring to FIG. 5, a function of the pair of curved parallel mirrors 40 will be described.

In the embodiment, the pair of curved parallel mirrors 40 is arranged to be inclined to have a predetermined angle A between the lens optical axis P of the collimator lens 30 (the parallel light M emitting direction) and a normal S1 at a position where the lens optical axis P intersects the semi-transparent curved mirror 41. Thus, the parallel light M incident on the pair of curved parallel mirrors 40 repeats reflection between the semi-transparent curved mirror 41 and the curved mirror 42. At this time, as the centers of curvature of the semi-transparent curved mirror 41 and the curved mirror 42 are the same (a first center of curvature C1), an incident angle of the reflected light entering the semi-transparent curved mirror 41 is always the angle A, and an incident angle of the reflected light entering the curved mirror 42 is always an angle (A+a).

A part of the light first entered into the semi-transparent mirror 41 is emitted as transmitted light N1 when entering the semi-transparent mirror 41. The light quantity ratio between the transmitted light N and the reflected light in the semi-transparent curved mirror 41 is 1:9. Therefore, the light quantity of the transmitted light N1 becomes a light that is attenuated to $1/10$ of the light quantity of the parallel light M first entered into the semi-transparent curved mirror 41. The transmitted light N1 is different only in the light quantity compared with the parallel light M, and it is the light obtained by collimating the image light L similar to the parallel light M. Further, as the light quantity ratio between the transmitted light N and the reflected light in the semi-transparent curved mirror 41 depends on the angle A, the angle A is set to obtain a desired light quantity ratio. Incidentally, when the incident angle A becomes smaller, the light quantity of the transmitted light N increases in the light quantity ratio between the transmitted light N and the reflected light. Eventually, the brightness of the virtual image V to be recognized by the observer increases, but as the light quantity of the reflected light becomes smaller, the attenuation of the reflected light at each reflection increases, the reflected light hardly reaches a position away from the incident position of the curved parallel mirror 40, and the transmitted light N becomes difficult to emit in a wide range of the semi-transparent mirror 41. Further, the light quantity ratio between the transmitted light N and the reflected light in the semi-transparent curved mirror 41 is adjustable by a thickness of the coating of a dielectric multilayer film formed on the semi-transparent curved mirror 41.

On the other hand, of the parallel light M first entered into the semi-transparent curved mirror 41, the light not emitted as the transmitted light N1 reflects on the semi-transparent curved mirror 41, travels toward the curved mirror 42, and reflects on the curved mirror 42, thereby entering again (twice) the semi-transparent curved mirror 41. When the parallel light M enters the semi-transparent curved mirror 41 at the second time, as in the first time, the pair of curved parallel mirrors 40 emits transmitted light N2 that is similar to the parallel light M. In this way, the pair of curved parallel mirrors 40 enters the parallel light M from the collimator lens 30, repeats reflection of the parallel light M between the semi-transparent curved mirror 41 and the curved mirror 42, thereby emitting the transmitted light N (N1, N2, . . . , Nx) whenever entering the parallel light into the semi-transparent curved mirror 41. These transmitted light N (N1, N2, . . . , Nx) are always emitted at a substantially constant emission angle (almost the angle A) with respect to the normal S (S1, S2, . . . , Sx) of the semi-transparent mirror 41. In other words, the semi-transparent mirror 41 emits as to diverge a plurality of transmitted light N inclined by $2\alpha$ whenever repeating the reflection (Nx–N (x–1)=N3–N2=N2–N1=$2\alpha$). The angle $\alpha$ mentioned here varies depending on the angle A, the first radius of curvature R1, and the distance d1 between the semi-transparent curved mirror 41 and the curved mirror 42 around the first axis C1. The angle $\alpha$ increases as the angle A decreases, or the first radius of curvature R1 increases, or the distance d1 increases, and is appropriately set. As described above, the pair of curved parallel mirror 40 in the embodiment enters the parallel light M from the collimator lens 30, and repeats reflection of the parallel light M between the semi-transparent curved mirror 41 and the curved mirror 42, thereby stably emitting the transmitted light N that is inclined by a certain angle (an angle of $2\alpha$) and attenuated by a certain light quantity (attenuated by $1/10$) whenever reflecting the parallel light on the semi-transparent curved mirror 41.

The curved surface shape of the curved parallel mirror 40 can be obtained from the curved surface shape of the windshield 2a by using commercially available optical simulation software (for example, Synopsys Inc. CODEV, Lambda Research Corp. OSLO, etc.).

Figure 6:
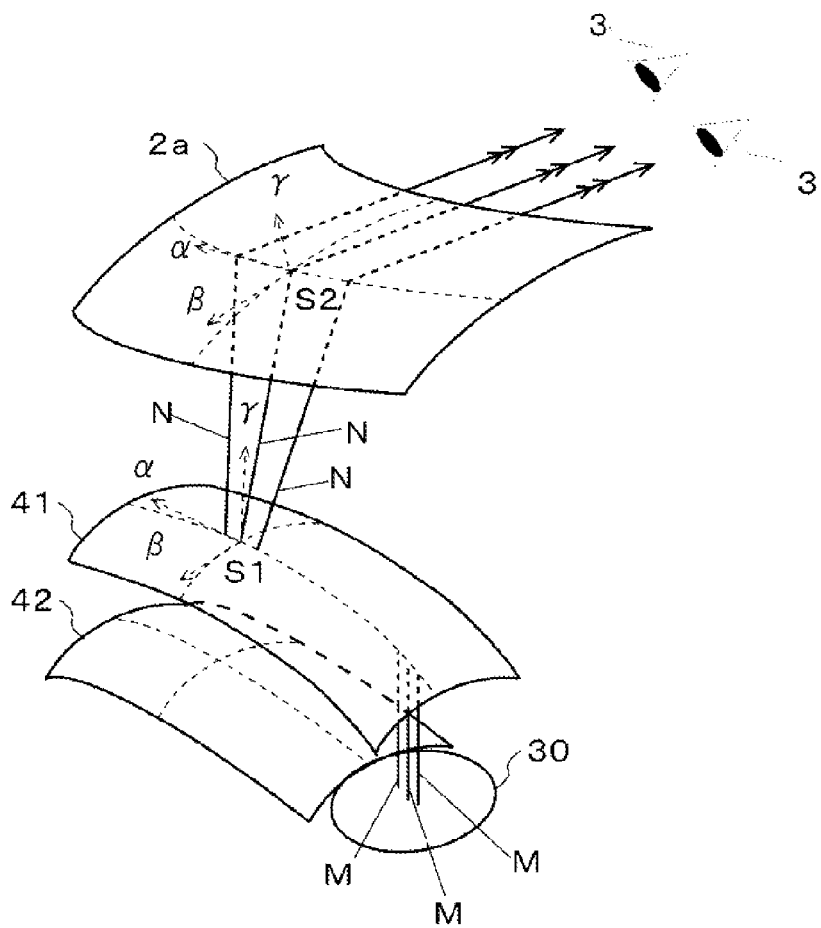
FIG. 6 is a schematic diagram for explaining optical simulation according to the above embodiment.

Referring to FIG. 6, a description will be given of the curved surface shape of the curved parallel mirror 40 obtained by optical simulation.

In the optical simulation, regarding arbitrary reference points 51 and S2 as an origin, the curved parallel mirror 40 (semi-transparent curved mirror 41) and the windshield 2a are assumed to have a γ-axis in the direction vertical to the convex surface, an α-axis in the lateral direction of the vehicle 2, and a β-axis in the direction vertical to the α-axis and γ-axis (FIG. 6). In the optical simulation, the βγ plane (FIG. 6) corresponds to the YZ plane described above (FIGS. 1 and 2).

The curved surface shape (curvature) of the curved parallel mirror 40 is, as shown in FIG. 6, determined by optical simulation based on parameters, such as, a curved surface shape of the windshield 2a, a positional relationship between the windshield 2a and the curved parallel mirror 40, and a position of the eye 3 of the observer, to have a convex surface toward the windshield 2a such that the display light (transmitted light N) emitted from the curved parallel mirror 40, traveling in the diverging direction, enters the windshield 2a having a concave shape toward the inside of the vehicle 2, and the light incident on the windshield 2a reflects toward the eye 3 of the observer as light parallel to the YZ plane. Specifically, the parameters include a radius of curvature Rα in the α-axis direction of the windshield 2a (a radius of curvature about the cross section of the windshield 2a), a radius of curvature Rβ in the β-axis direction of the windshield 2a (a radius of curvature about the longitudinal section of the windshield 2a), an angle formed between the γ-axis and the Z-axis of the windshield 2a, a distance between the reference point S2 of the windshield 2a and the reference point 51 of the curved parallel mirror 41, an angle formed between the taxis and Z-axis of the curved parallel mirror 40, and a distance between the eye 3 of the observer and the reference point S2 of the windshield 2a. From these parameters, the first curvature R1 in the α-axis direction and the second curvature R2 in the β-axis direction of the semi-transparent curved mirror 41, and the third curvature R3 in the α-axis direction and the fourth curvature R4 in the β-axis direction of the curved mirror 42 are determined. Incidentally, by making the first curvature R1 in the α-axis direction of the semi-transparent curved mirror 41 substantially the same as the radius of curvature Rα of the windshield 2a and making the second curvature R2 in the β-axis direction of the semi-transparent curved mirror 41 substantially the same as the radius of curvature Rβ of the windshield 2a, the display light N reflected by the windshield 2a travels in the direction of the eye 3 of the observer as light almost parallel to the YZ plane.

As described above, it is possible to obtain the curved surface shape of the curved parallel mirror 40 from the curved surface shape of the windshield 2a by optical simulation.

Since the HUD device 1 includes the curved parallel mirror 40 described above, the transmitted light N emitted by the curved parallel mirror 40 and emitted from the HUD device 1 reflects on the windshield 2a, and becomes parallel light in the lateral direction of the eye 3 of the observer shown in FIG. 6 (light parallel to the YZ plane). Therefore, the observer views the virtual image V of the display image represented by the transmitted light N reflected by the windshield 2a (the virtual image projected onto the windshield 2a), and recognizes through the windshield 2a as if the display image is present in a distant place.

(Control Unit)

A control unit (not shown) controls the light source 11, the liquid crystal display panel 13 and the like. For example, the control unit controls the liquid crystal display panel 13 by sending a video signal to the liquid crystal display panel 13. The control unit comprises a CPU, a ROM, a general-purpose memory, a video memory, an external interface and the like. The external interface is connected to a CAN (Control Area Network) bus for transmitting and receiving information on the light source, the liquid crystal display panel 13, and the vehicle 2. The external interface is also connected to an input means for accepting a key input for adjusting the brightness and the like of the light source 11.

According to the HUD device 1 described in the above embodiment, the HUD device 1 is able to project a virtual image V onto a curved surface, and an observer is able to recognize as if a display image is present in a distant place in a wide range of lateral direction. This is achieved by the following configuration.

A head-up display device that projects display light N to a curved surface and allows recognizing an image represented by the display light N as a virtual image by reflecting the display light N on the curved surface, the head-up display device comprising a display means 10 that emits image light L representing an image; a collimating optics 30 that collimates the light emitted from the display means 10 into parallel light M; and a curved surface optics 40 that enters the parallel light M from the collimating optics 30 and emits a plurality of transmitted light N by oppositely arranging a semi-transparent curved surface 41 that reflects a part of the parallel light M and transmits a part thereof as transmitted light N, and a curved reflection surface 42 that reflects the parallel light M to the semi-transparent curved surface 41, wherein the curved surface optics 40 has a convex curved surface shape toward a transmission side such that when the emitted plurality of transmitted light N is reflected by the curved surface, the reflected transmitted light N becomes display light N representing a virtual image substantially parallel to a first plane (YZ plane).

Second Embodiment

Figure 7:
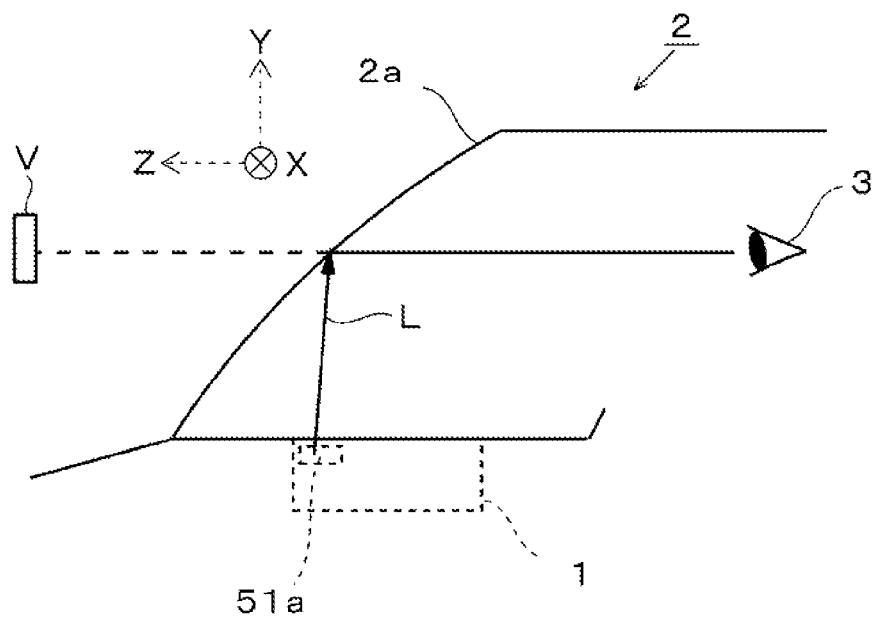
FIG. 7 is a schematic diagram showing a state that a head-up display device according to a second embodiment of the present invention is mounted on a vehicle.
Figure 8:
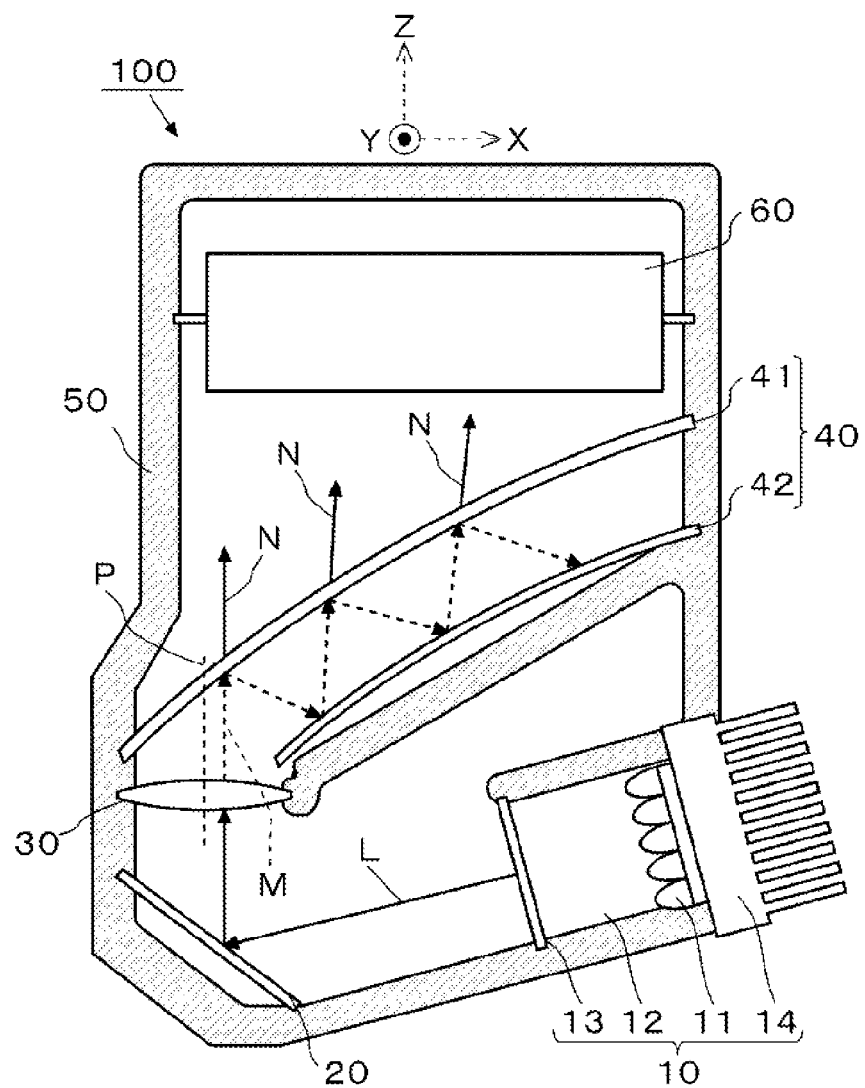
FIG. 8 is a schematic sectional view in an XZ plane showing a configuration of a head-up display device according to the above embodiment.
Figure 9:
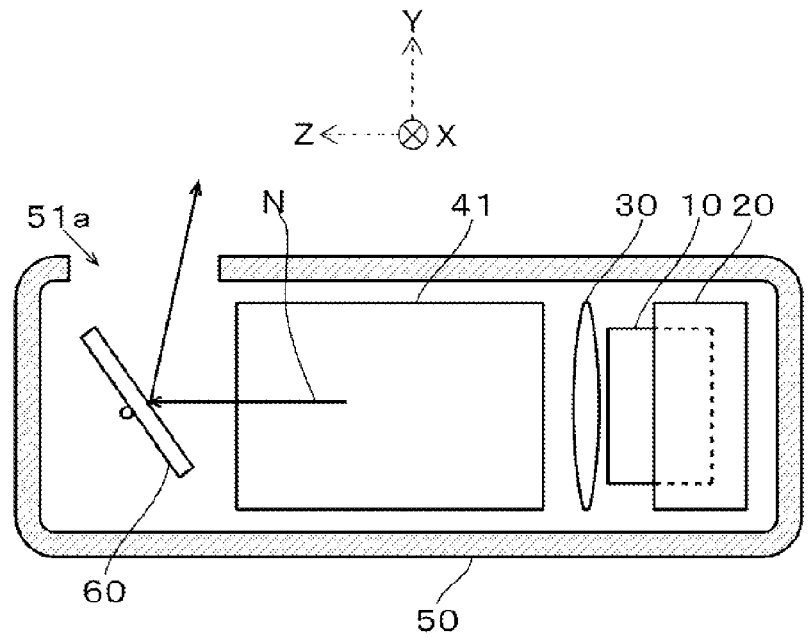
FIG. 9 is a schematic sectional view in a YZ plane showing a configuration of a head-up display device according to the above embodiment.
Figure 10:
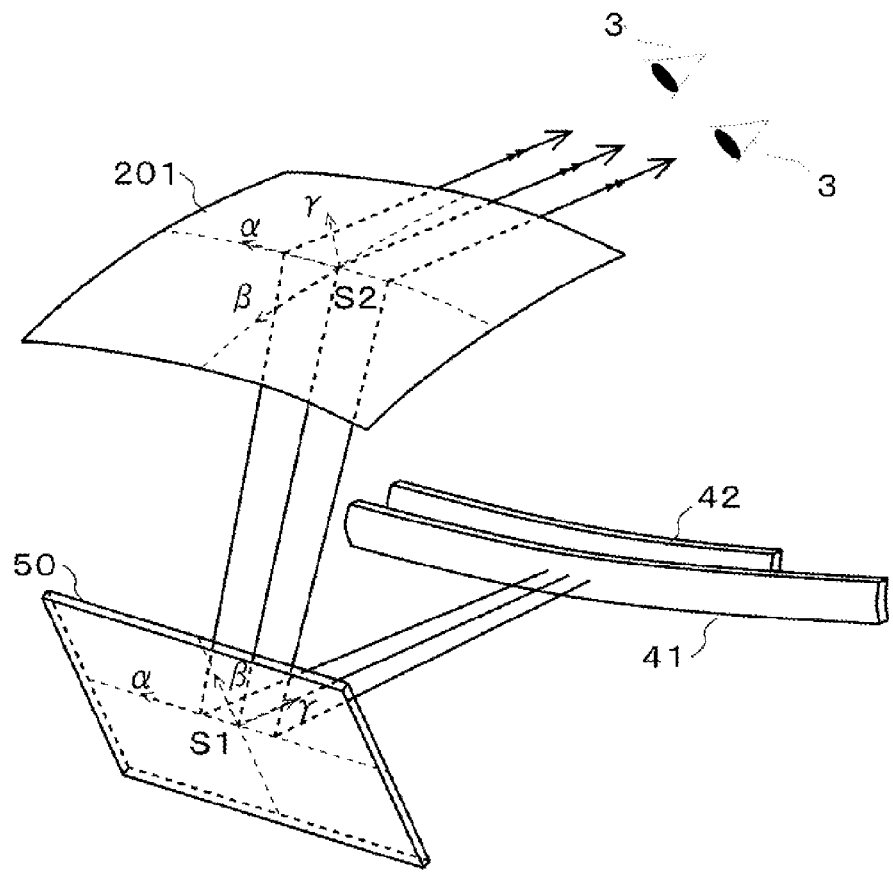
FIG. 10 is a schematic diagram for explaining optical simulation according to the above embodiment.

Hereinafter, a second embodiment according to the present embodiment will be described with reference to FIG. 7 to FIG. 10. FIG. 7 is a schematic diagram showing an outline of a HUD device 1 according to the embodiment. FIG. 8 is a schematic sectional view in an XZ plane showing a configuration of a HUD device 1 according to the embodiment. FIG. 9 is a schematic sectional view in a YZ plane showing a configuration of a HUD device 1 according to the embodiment. FIG. 10 is a schematic diagram for explaining optical simulation according to the embodiment.

The HUD device 1 in the second embodiment is different from the first embodiment in that a plane mirror 60 is further provided for reflecting the transmitted light N emitted from the curved parallel mirror 40 on the windshield 2a. The plane mirror 60 is arranged on the optical path of the transmitted light N emitted from the curved parallel mirror 40 at a predetermined angle to reflect the transmitted light N on the windshield 2a. The transmitted light N reflected by the plane mirror 60 is emitted from an emitting part 51a that is opened on the XZ plane of the housing 50, and enters the windshield 2a. As a plurality of transmitted light N emitted from the curved parallel mirror 40 is emitted in a divergent direction inclined by a predetermined angle, respectively, the light reflected on the windshield 2a by the plane mirror 60 also travels in the divergent direction. The divergent light reflected by the plane mirror 60 reflects on the windshield 2a, and becomes light parallel in the lateral direction of the eye 3 of the observer shown in FIG. 10 (light parallel to the YZ plane). Therefore, the observer views the virtual image V of the display image represented by the transmitted light N reflected by the windshield 2*a* (the virtual image projected onto the windshield 2*a*), and recognizes, through the windshield 2*a*, as if the display image is present in a distant place.

The collimator lens 30 may be an optical system comprising a plurality of convex lenses, or a combination of a convex lens and a concave lens or the like. Further, a lenticular lens may be used as the collimator lens 30.

The curved surface onto which the virtual image V is projected is not limited to the windshield 2*a* of the vehicle 2. The curved surface onto which the virtual image V is projected may be a curved glass in a building, a spectacle lens or the like.

In the above description, in order to facilitate the understanding of the present invention, a description of unimportant known technical matters is omitted as appropriate.

INDUSTRIAL APPLICABILITY

The present invention is applicable as a head-up display device, which projects an image onto a windshield or the like of a vehicle, and displays a virtual image.

DESCRIPTION OF REFERENCE NUMERALS

1 Head-up display device (HUD device)
2 Vehicle
2*a* Windshield
3 Eye
10 Display means
20 Folding mirror
30 Collimator lens (Collimating optics)
40 Curved parallel mirror (Curved surface optics)
41 Semi-transparent curved mirror (Semi-transparent curved surface)
42 Curved mirror (Curved reflection surface)
50 Housing
51 Emitting part
C1 First axis
C2 Second axis
L Image light
M Parallel light
N Transmitted light (Display light)
P Lens optical axis
R1 First radius of curvature
R2 Second radius of curvature
R3 Third radius of curvature
R4 Fourth radius of curvature

The invention claimed is:

1. A head-up display device that projects display light to a curved surface and allows recognizing an image represented by the display light as a virtual image by reflecting the display light on the curved surface, the head-up display device comprising:
   a display means that emits light representing the image;
   a collimating optics that collimates the light emitted from the display means into parallel light; and
   a curved surface optics that enters the parallel light from the collimating optics and emits a plurality of transmitted light by oppositely arranging a semi-transparent curved reflection surface that reflects a part of the parallel light and transmits a part thereof as transmitted light, and a curved reflection surface that reflects the parallel light to the semi-transparent curved reflection surface,
   wherein the curved surface optics has a convex curved surface shape toward a transmission side such that when the emitted plurality of transmitted light is reflected by the curved surface, the reflected transmitted light becomes display light representing the virtual image substantially parallel to a first plane.

2. The head-up display device according to claim 1, wherein the curved surface optics is formed on a rotation surface having a curvature.

3. The head-up display device according to claim 1, wherein the curved surface optics is formed on a toroidal surface having different orthogonal curvatures.

4. The head-up display device according to claim 2, wherein
   the semi-transparent curved reflection surface has a center of curvature at a position substantially the same as a center of curvature of the curved reflection surface.

* * * * *